May 20, 1969  R. J. KILLIUS ET AL  3,444,960

ANTICHATTER LUBRICATION

Filed Dec. 27, 1966

INVENTORS
ROY W. WIESENBORN
ROBERT J. KILLIUS
BY
*William H. Duffey*
ATTORNEY

United States Patent Office 3,444,960
Patented May 20, 1969

3,444,960
ANTICHATTER LUBRICATION
Robert Killius, St. Louis, and Roy W. Wiesenborn, Hazelwood, Mo., assignors to Monsanto Company, a corporation of Delaware
Filed Dec. 27, 1966, Ser. No. 604,740
Int. Cl. F01m 1/00; F16n 17/06, 29/00
U.S. Cl. 184—6                    2 Claims

ABSTRACT OF THE DISCLOSURE

Means and method for reducing clutch plate chatter in a limited slip differential which comprises introducing a controlled flow of oil to the clutch plates.

---

Figure 1:
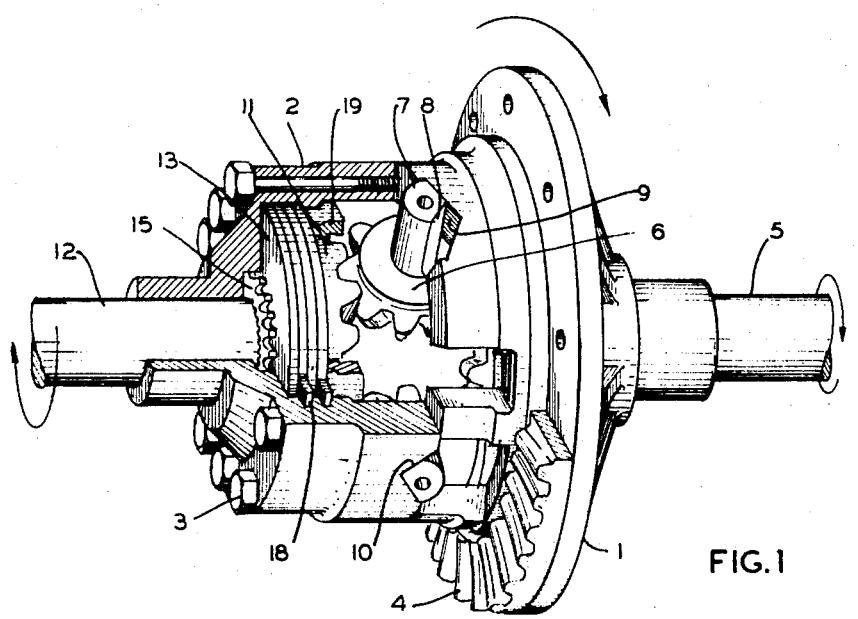

This invention relates to limited slip differentials such as those employed in certain motor vehicles. More specifically, it relates to a mechanical modification of these differentials whereby the lubricant becomes more effective in reducing clutch plate chatter.

The conventional differential used in most of today's automative vehicles divides the load equally between both wheels in ordinary driving and, when turning, drives the wheel which is easier to turn. This is a definite disadvantage under adverse weather and road conditions where the traction of one wheel is limited. In recent years, some vehicles have adapted the controlled slip or limited slip differential, sometimes referred to as a slip-lock differential.

The limited slip differential is a device which maintains an equal torque distribution to the wheels of a vehicle as opposed to the conventional differential which automatically drives the wheel easier to turn. Limited slip differential units for automotive rear axles contain a stack of clutch plates on each axle assembly which acts to retard the movement of the faster running wheel. When one wheel is slipping on mud or ice, for example, the clutch plates on each axle operate to equalize the velocity of the axles and direct equal torque to both the slipping and nonslipping wheels. This enables the vehicle to move in situations where a conventional differential would continue to direct the torque to the slipping wheel.

With the higher horsepower available for modern engines, the limited slip differential is effective in preventing wheel spin and sudden shock loads under nonuniform surface conditions such as rough roads, ice patches, wet and dry pavement, etc. In the case of an automobile that has one rear wheel on a low friction surface such as ice and the other rear wheel on a high friction surface such as concrete, a conventional differential can deliver to the wheel on the high friction surface only the torque absorbed by the spinning wheel plus the friction in the differential gear set. Since this friction is minimal, no usuable power is realized. With the limited slip differential, however, equalized friction is built into the differential so that the driving force delivered to each wheel is about equal during all conditions. This is sufficient to prevent stalling and wild wheel spin which are experienced with conventional differentials.

Limited slip differentials depend upon smooth and firm engagement of the clutch members for efficient transmission of power. Experience with these units, however, has revealed a tendency for the clutch plates to grab under certain driving conditions. For example, when the vehicle is subjected to a sharp turn, the wheel on the outside arc of the turn is caused to rotate faster than the pivoting wheel. The faster rotating wheel causes torque to build up in the clutch packs. When this torque becomes great enough to overcome the friction in the clutch packs, relative motion takes place between the plates splined to the axle and those keyed to the differential carrier. This has frequently resulted in clutch chatter which can range in intensity from a single impluse to a prolonged shudder of the entire vehicle. If clutch chatter is allowed to continue for an extended period, it can cause excessive wear of parts and premature breakdown of the unit.

It has been found that the type of lubricant employed in the limited slip differential has a profound effect on clutch performance. Selecting the proper lubricant, however, is complicated by the presence of two different mechanisms within the same housing having diverse lubrication requirements. The hypoid gear mesh of the main power train demands a powerful extreme pressure lubricant suitable for both high torque and high speed driving conditions. Friction surfaces of the differential clutch plates, on the other hand, require a lubricant having a low coefficient of friction, i.e., high in oiliness or lubricity. These requirements are only different, they are usually incompatible.

To contribute to smooth operation of the differential clutch, the lubricant employed therein should posses a unique combination of functional properties. It should be capable of allowing the clutch plates to slide smoothly into contact and then to become firmly engaged with each other. It should not permit the engaged plates to slip even when heavy loads are applied to the differential. Neither should it permit the plates to grab while they are being engaged or disengaged. Failure of the lubricant to satisfy the above frictional requirements will result in interrupted and inefficient transmission of power which generally manifests itself in the clutch chatter described above.

Through intensive research efforts, it has been possible to provide gear lubricants specifically designed to give improved clutch performance in a limited slip differential in combination with a high level of extreme pressure gear lubrication under both high speed and high torque conditions. It has been found, however, that even with the introduction of these superior lubricants, the smoothness of operation of limited slip differentials is still less than ideal. Under certain conditions of load, speed, and maneuvering, there will usually be found some degree of clutch chatter. Because the exact cause and mechanism of clutch plate chatter are not fully understood, progress toward eliminating this condition has heretofore been slow. Designers have tried many different approaches without success.

Through the remarkable discovery of the present invention, however, it is now possible to provide smoother and quieter operation of most limited slip differential configurations by improving the method of introducing lubricant to the clutch plates. The plates are now provided with a substantially improved degree of lubrication and the occurrence of clutch chatter is eliminated or drastically reduced.

It is an object of the present invention, therefore, to provide a means for reducing or eliminating the clutch chatter found in limited slip differentials.

Another object of the present invention is to provide a means for increasing the effectiveness of clutch plate lubrication.

Other objects of this invention and the nature thereof will become apparent from the following description considered in connection with the accompanying figures of the drawing.

Figure 2:
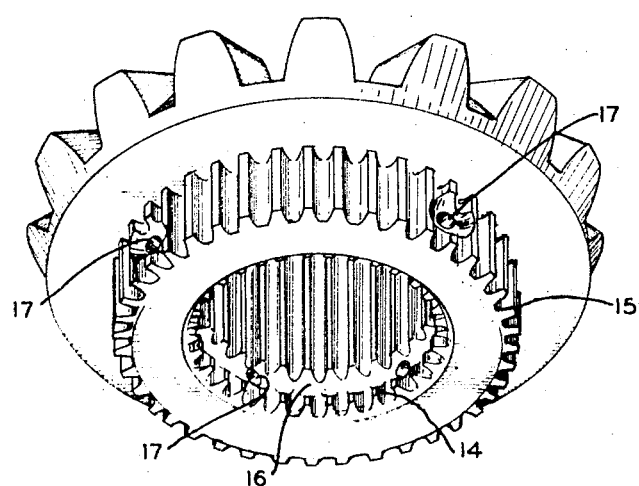

In the drawings:
FIGURE 1 is a perspective view of a typical limited slip differential mechanism with the differential carrier cut away to expose the clutch, side gear, and differential pinion.
FIGURE 2 is a perspective view of a differential side gear showing the special lubrication features taught by the present invention.

Broadly stated, the present invention reduces clutch plate chatter in a limited slip differential by introducing a controlled flow of oil to the clutch plates. The plates have heretofore been lubricated by splash alone. By means of an oil annulus and one or more radial holes through the wall of the side gear at the clutch plate location, the lubricant is cast into the clutch assembly with centrifugal action.

By reference to FIGURE 1 of the drawing, the operation of the limited slip differential can be understood. The differential housing and axle housing, both stationary members, have been omitted from the drawing to promote clarity. The main rotating structural members are ring gear carrier 1 and differential carrier 2. These are held together by a row of retaining bolts, shown typically by reference numeral 3. Differential carrier 2 is readily distinguishable because it is sectioned in FIGURE 1. Concentrically affixed to ring gear carrier 1 is ring gear 4, which is caused to rotate by a pinion drive gear on the output end of the vehicle drive shaft. This is the hypoid gear mesh referred to above. Wheel axle 5 is journalled through ring gear carrier 1 and is splined into a side gear. Axle 5 rotates in the same direction as gear carrier 1 and either at the same or at a different velocity.

With continued reference to FIGURE 1, differential pinion 6 is typical of four such bevel gears disposed 90 degrees apart within the assembly. Pairs of pinions 6 are mounted on each of two pinion shafts 7 set at right angles to each other and having a loose fit at their intersection. The ends of shafts 7 incorporate a pair of flats, shown typically by reference numeral 8, which are indexed 180 degrees apart on each shaft. Flats 8 engage corresponding ramps 9 and 10 in ring gear carrier 1 and differential carrier 2, respectively. In mesh with differential pinion 6 is differential side gear 11, which imparts rotation to axle 12. Wheel axle 5 has an identical side gear which is obscured in FIGURE 1.

To better understand the operation of clutch plates 13, reference can be made to FIGURE 2 wherein the details of side gear 11 are illustrated. Internal splines 14 are the coupling means for the wheel axles. External splines 15 engage those alternate plates of the clutch assembly which have corresponding internal splines. Circumferential groove 16 is the oil annulus comprising one of the features of the instant invention. Four holes, shown typically at 17, are located 90 degrees apart and permit the differential lubricant to flow from groove 16 radially into the clutch pack. This lubrication feature distinguishes the present invention from prior devices of this type.

Referring again to FIGURE 1 of the drawing, clutch plates 13 are observed as the engaging means between ring gear 4 via carriers 1 and 2 and side gear 11, the latter being splined to wheel axle 12. Those plates which do not engage external splines 15 of side gear 11 contain antirotation tangs 18 which are keyed into differential carrier 2. Half of the plates, therefore, rotate with carrier 2 and the other half rotate with side gear 11. Friction member 19 is adapted to engage side gear 11 under certain conditions of axial travel. An identical situation exists, of course, with respect to wheel axle 5.

Operation of the limited slip differential is described as follows. When the vehicle is proceeding on a straight course, the rotational driving force of carriers 1 and 2 causes pinion shafts 7 to move up their respective ramps. This ramping effect causes each differential pinion 6 to move laterally toward the respective wheels. The resulting pressure on friction members 19 and side gears 11 loads clutch plates 13 and locks axles 5 and 12 to carriers 1 and 2. Thus, under straight driving conditions, there is no rotation of differential pinions 6.

When the vehicle is turning a corner, however, a different situation prevails because wheel axles 5 and 12 must have unequal velocities. If it is arbitrarily assumed that wheel axle 12 starts turning faster than wheel axle 5, the following events take place. The higher velocity of axle 12 generates sufficient torque to overcome the friction in clutch plates 13. This allows axles 5 and 12 to rotate at different velocities, and causes pinions 6 to rotate about shaft 7, thus permitting differentialing of the axles.

When one wheel has traction and the other does not, the unit acts much the same as during straight driving. Clutch plates 13 lock up as described above. Equal velocity is thereby imparted to the two wheels, the wheel without traction rotating at a speed equal to that of the wheel with traction. Wild wheel spin is thus avoided.

Prior to discovery of the remarkable anti-chatter innovation taught by the present invention, the clutch plates of limited slip differentials were lubricated solely by the splash oil which was churned through rotation of the mechanical parts. No lubricant was intentionally introduced to the inside of the clutch pack because it was felt that chatter was due to the nature of the lubricant rather than the amount of lubricant on the plates. Hence, development efforts were directed mainly toward finding antichatter lubricants capable of overcoming operational deficiencies of the differential.

The outstanding improvements afforded by the present invention are the result of an effort to make existing lubricants more effective in reducing clutch plate chatter. An unexpected degree of chatter reduction was obtained as a direct result of the side gear configuration changes illustrated in FIGURE 2 of the drawing. The provision of a plurality of radial holes emanating from an internal oil annulus resulted in a drastic reduction in clutch chatter. The preferred configuration comprised four holes at 90 degree intervals, each having a nominal diameter of 0.09 inch, and drilled through the wall of each side gear. The holes are counter-drilled at the outside to better distribute the lubricant throughout the clutch plates. The width of the groove was approximately 0.20 inch wide and 0.09 inch deep. Lubricant flows along the internal splines of the side gear and collects in the oil annulus. From there it is centrifuged through the radial holes into the clutch pack as the vehicle travels.

To illustrate the antichatter benefits of the present invention, comparative road tests were conducted under characteristic driving conditions. A production-type limited slip differential was installed in a 1965 Chevrolet automobile having a V-8 engine and automatic transmission. The lubricant employed for the differential was a hydrocarbon oil lubricant containing various multipurpose additives and conforming to the requirements of Military Specification MIL-L-2105 B.

The test procedure included a series of maneuvers, tight turns, and figure 8's, followed by sustained highway driving. Although the production-type limited slip diffeerntial created audible chatter during certain maneuvers, a complete recovery from chatter was made after 0.2 mil of figure 8's. However, a highway drive of 300 miles revealed that prolonged highway operation again caused the differential to become noisy with medium to heavy chatter when making tight turns. The noise and chatter would gradually dissipate if the vehicle was kept in a tight turn for 0.2 to 0.3 mil, but would reappear after more highway driving.

The differential was then disassembled and the production-type side gears were reworked to incorporate the oil annulus and holes taught by the present invention. The unit was reassembled and the same type of lubricant was used. A repeat of the same road test schedule produced markedly different results. In contrast to the recurring chatter condition experienced with the production parts, there was no noise or chatter with the modified configuration of the present invention. After a series of maneuvers, 300 miles of highway driving, and still more maneuvers, there could be heard no chatter in the differential.

It is to be understood that various mechanical modifications may be made to the limited slip differential without departing from the principle set forth in the illustrated embodiment. For example, instead of the ramp mechanism shown in the drawing, a spring-loaded device might be employed to permit lateral travel of the pinion assembly for control of clutch pressure. Instead of the plate clutch illustrated herein, a conical clutch or equivalent means might be utilized.

Furthermore, the improved clutch lubrication means taught herein is susceptible to modification. For example, the number, location, and size of the oil holes might be varied while still obtaining good results. Thus, since many different embodiments of the invention may be made without departing from the scope thereof, it is intended that all matter contained in the above description and shown in the accompanying drawing shall be considered as illustrative and not in a limiting sense.

The embodiments of this invention in which an exclusive property or privilege is claimed are defined as follows:

1. A limited slip differential comprising a rotatable differential casing, a pair of axle shafts journalled in opposite ends of said casing for rotation about the same axis as said casing, a differential side gear in driving connection with each of said axle shafts within said casing, a plate clutch on each of said side gears adapted to transmit torque from said casing to each of said axle shafts, the plates of said clutch alternately affixed to said casing and said side gear, a plurality of pinion shafts disposed transversely to said axle shaft and slidably retained by said casing for torque-responsive movement along the axis of said axle shafts, a plurality of differtial pinion gears rotatably mounted on said pinion shafts, each of said pinion gears in mesh with one of said side gears, a supply of lubricant disposed within said casing and on the inside diameter of said side gears, and a plurality of radial passages through said side gears for centrifugal lubrication of said clutch plates during rotation of said side gears.

2. A limited slip differential comprising a rotatable differential casing, a pair of axle shafts journalled in opposite ends of said casing for rotation about the same axis as said casing, a differential side gear in driving connection with each of said axle shafts within said casing, a plate clutch on each of said side gears adapted to transmit torque from said casing to each of said axle shafts, the plates of said clutch alternately affixed to said casing and said side gear, a plurality of pinion shafts disposed traversely to said axle shafts and retained by said casing, the ends of said pinion shafts adapted to engage ramped surfaces in said casing for torque-responsive movement along the axis of said axle shafts, a plurality of differential pinion gears rotatably mounted on said pinion shafts, each of said pinion gears in mesh with one of said side gears, a supply of lubricant disposed within an oil annulus on the inside diameter of said side gears, and a plurality of radial passages through the wall of said side gears in communication with said oil annulus for centrifugal lubrication of said clutch plates during rotation of said side gears.

References Cited

UNITED STATES PATENTS

| | | | |
|---|---|---|---|
| 1,132,748 | 3/1915 | Sundh. | |
| 1,170,057 | 2/1916 | Farnum | 74—467 X |
| 2,463,091 | 3/1949 | Dortort | 74—711 |
| 2,869,399 | 1/1959 | Miles | 74—711 |
| 3,099,166 | 7/1963 | Schou | 192—113 X |
| 3,109,323 | 11/1963 | Saurer | 74—711 |
| 3,211,022 | 10/1965 | Anderson | 74—711 |

ARTHUR T. McKEON, *Primary Examiner.*

U.S. Cl. X.R.

74—467, 710.5